United States Patent
Shtarkman

(10) Patent No.: US 6,345,788 B1
(45) Date of Patent: Feb. 12, 2002

(54) COMPOSITE STRUCTURE ELEMENT WITH BUILT-IN DAMPING

(75) Inventor: Emil M. Shtarkman, Marina Del Rey, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/321,502

(22) Filed: May 27, 1999

(51) Int. Cl.$^7$ .................................................. B64G 1/00
(52) U.S. Cl. .................................................. 244/158 R
(58) Field of Search .............................. 244/117 R, 119, 244/133, 121, 158 R; 343/909, 912; 156/177; 428/294, 284; 427/172, 306; 264/DIG. 36

(56) References Cited

U.S. PATENT DOCUMENTS

| | | | | |
|---|---|---|---|---|
| 4,310,132 A | * | 1/1982 | Robinson et al. | 244/119 |
| 4,411,380 A | * | 10/1983 | McWithey et al. | 244/119 |
| 4,682,744 A | * | 7/1987 | Gounder | 244/158 R |
| 4,770,929 A | * | 9/1988 | Nobumasa et al. | 428/284 |
| 4,812,854 A | * | 3/1989 | Boan et al. | 343/909 |
| 4,898,783 A | * | 2/1990 | McCullough, Jr. et al. | 428/284 |
| 4,983,451 A | | 1/1991 | Sugino et al. | |
| 5,171,630 A | * | 12/1992 | Muzzy et al. | 428/294 |
| 5,196,100 A | * | 3/1993 | Goffetre et al. | 427/172 |
| 5,494,634 A | * | 2/1996 | Edelstein et al. | 264/DIG. 36 |
| 5,624,088 A | * | 4/1997 | Fiore | 244/158 R |
| 5,655,757 A | | 8/1997 | Starkovich et al. | |
| 5,806,796 A | * | 9/1998 | Healey | 244/117 R |
| 5,848,767 A | * | 12/1998 | Cappa et al. | 244/158 R |
| 5,902,294 A | * | 7/1999 | Allen | 343/912 |
| 5,961,078 A | * | 10/1999 | Edberg et al. | 244/158 R |
| 6,045,680 A | * | 4/2000 | Cawston et al. | 427/306 |
| 6,048,426 A | * | 4/2000 | Pratt | 156/177 |
| 6,098,926 A | * | 8/2000 | Morgenthaler | 244/133 |

OTHER PUBLICATIONS

*Constitution of Binary Alloys, Second Supplement*, Francis A. Shunk, McGraw–Hill Co., 1969, pp. 500–503.

"Ultrahigh–Modulus Fibers—A New Dimension for Graphite–Aluminum and Graphite–Magnesium Composites" by Stan Paprocki et al., *Enigma Eighties Econ. Energy Book 2*, 24(2), 1979, pp. 1451–1457.

Carbon Fibers by Jean–Baptiste Donnett and Roop Chand Bansal, Marcel Dekker, Inc., 1984, pp. 223–247.

Metals Handbook, Tenth Edition, vol. 2, Properties and Selection: Non–Ferrous Alloys and Special–Purpose Materials, "Selection and Application of Magnesium and Magnesium Alloys", Housh et al., 1990, pp. 455–457 and 461–465.

Turner, Raymond F., "Spacecraft Structures", *Spacecraft Systems Engineering*, Second Edition, vol. 9, pp. 237–245, 1995.

* cited by examiner

Primary Examiner—Galen L. Barefoot
(74) Attorney, Agent, or Firm—Antonelli, Terry, Stout & Kraus, LLP

(57) ABSTRACT

A composite structure element (14) with built-in damping is formed with a non-metallic matrix (15) reinforced by a plurality of filaments (18) within the matrix. A lightweight metal (19) having a specific damping capability of at least 1% is provided on at least one of the matrix and the filaments of the composite structure element for attenuating vibrations of the element. The lightweight metal is preferably a magnesium alloy or an aluminum alloy which is coated on the filaments (18) and/or the pores (22) of a porous matrix (16). A metal structural member, such as a satellite antennae (27), subject to disturbance when used for its intended purpose can also be provided with built-in damping by providing a lightweight metal (32) having a specific damping capability of at least 1% on the structural member on the wire mesh (29) of the deployable antennae for damping disturbances.

49 Claims, 5 Drawing Sheets

COMPOSITE STRUCTURE ELEMENT WITH BUILT-IN DAMPING

FIELD OF THE INVENTION

The present invention relates to a composite structure element with built-in damping capacity which will minimize and, in some instances, eliminate a need for expensive active structural-acoustic control systems, as well as active control non-acoustic disturbance control systems in spacecraft, aircraft structures, automobiles, precision machinery and the like. The invention further relates to apparatus utilizing the composite structure element and to a method of making the same.

BACKGROUND AND SUMMARY OF THE INVENTION

During launch of a spacecraft, the composite structures including composite payload fairings of the spacecraft are subject to a broad band of frequencies, high level acceleration disturbances. All composite components of a spacecraft do not have sufficient damping capabilities to suppress these vibrations and, therefore require spacecraft structure to be actively controlled. For example, commonly assigned U.S. Pat. No. 5,655,757 discloses an actively controlled damper which resists relative vibration of parts, and is particularly directed to an actively controlled damper which has a ring-shaped structure for damping vibration between a payload and an adapter fitting of a rocket launch vehicle.

Another problem arises in achieving fast settling times of a spacecraft. An undamped system with a very low natural frequency requires a long settling time during slew of the spacecraft which is undesirable.

An object of the present invention is to provide an improved composite structure element with built-in damping capacity which will minimize and in some instances eliminate the need for expensive active structural-acoustic control systems and active control non-acoustic disturbance control systems. The composite structure element of the invention can advantageously be used in spacecraft and also in aircraft, automobiles and in precision machinery.

A composite structure element with built-in damping according to one form of the invention comprises a non-metallic matrix, a plurality of filaments within the matrix reinforcing the matrix, and a lightweight metal having a specific damping capability of at least 1% provided on at least one of the matrix and the filaments of the composite structure element for attenuating vibrations of the element. In the disclosed embodiments, the lightweight metal is preferably selected from the group consisting of a magnesium alloy and an aluminum alloy. Most preferably, a magnesium alloy containing 0.1–10 wt. % zirconium, balance essentially magnesium is utilized for obtaining excellent damping capacity.

The composite structure element according to a first embodiment of the invention comprises a matrix of plastic about a plurality of filaments which are coated with a lightweight metal having a specific damping capability of at least 1%. The thickness of the coating on the filaments is preferably between 0.1 and 100 times a diameter of the filaments.

The composite structure element of a second embodiment of the invention comprises a porous, non-metallic matrix with the pores thereof being filled with a lightweight metal having a specific damping capability of at least 1%. In a disclosed example, the porous matrix is a carbonaceous material which is reinforced with filaments, e.g., carbon fibers, which may optionally be coated with a lightweight metal having a specific damping capability of at least 1%.

The filaments of the composite structure element can be continuous in length, extending unidirectionally as in a wound structure, or the filaments can extend bidirectionally, as with the use of a woven cloth of filaments. As another variation, the filaments can be relatively short and have a random directional orientation in the matrix. The filaments are preferably carbon fibers embedded in the non-metallic matrix in the disclosed embodiments, but other reinforcing fibers such as glass and aramid fibers could be used.

A disclosed apparatus of the invention utilizing the composite structure element comprises a rocket launch vehicle including an adapter interface fitting, a rocket payload mounted on the rocket launch vehicle by way of the adapter interface fitting, and a damper located between the rocket payload and the adapter interface fitting for damping vibrations between the rocket launch vehicle and the rocket payload. The damper includes at least one composite structure element according to the invention for attenuating vibrations.

The present invention further comprises a fairing for a spacecraft, particularly a payload fairing of a rocket, a spacecraft bus and a damper element of a rocket, formed with the composite structure elements of the invention for providing these components with a high specific damping to minimize or, in some instances, eliminate the need for active structural-acoustic control systems and active control non-acoustic disturbance control systems.

The composite structure element with built-in damping in a further embodiment of the invention comprises a metal mesh and a lightweight metal having a specific damping capability of at least 1% provided on the metal mesh for attenuating vibrations of the element. In the disclosed embodiment, the metal mesh is wire mesh of a satellite antenna on which a lightweight metal having a specific damping capability of at least 1% and selected from the group consisting of a magnesium alloy and an aluminum alloy, is provided for attenuating vibrations of the antenna. A related method of the invention for making a composite structure element with built-in damping comprises the steps of providing a structural member which is subject to being disturbed when used for its intended purpose and providing a lightweight metal having a specific damping capability of at least 1% on the structural member for damping disturbances of the structural member during its use.

These and other objects, features and advantages of the present invention will become more apparent from the following description when taken in connection with the accompanying drawings, which show, for purposes of illustration only, several embodiments in accordance with the present invention.

DETAILED DESCRIPTION OF THE INVENTION

Figure 1:
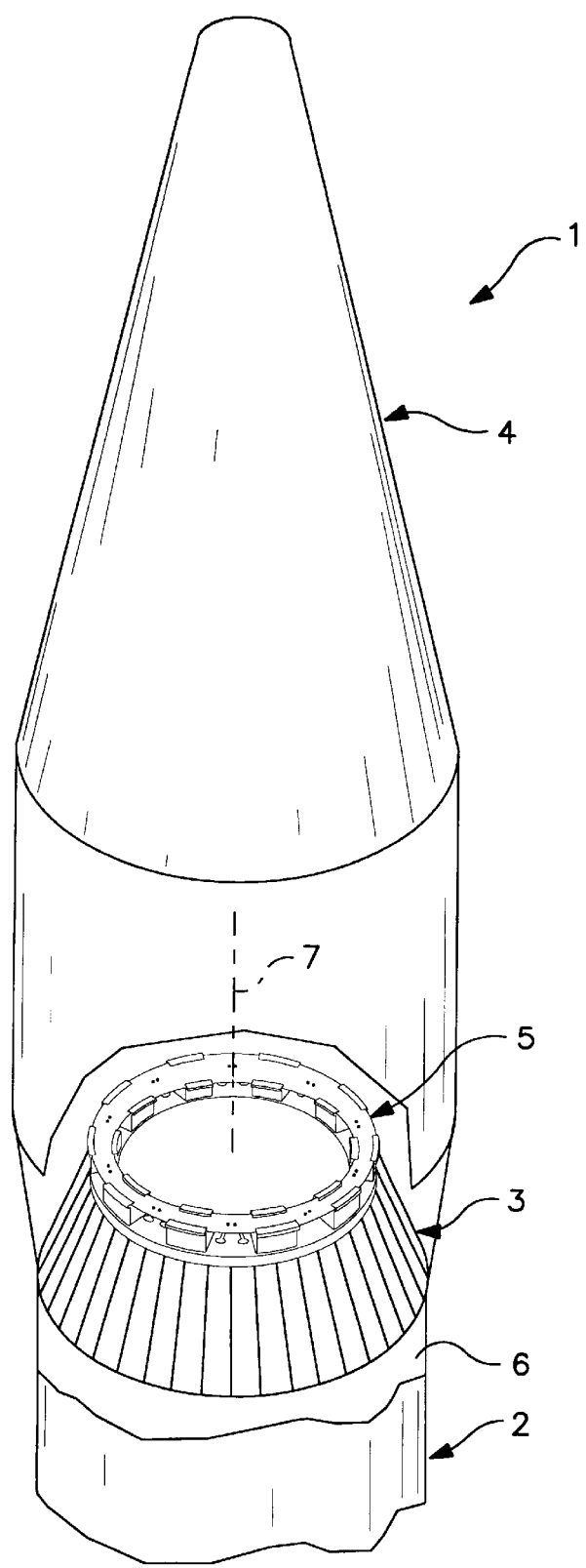
FIG. 1 is a schematic perspective view of a spacecraft embodying a damper constructed in accordance with the present invention.
Figure 2:
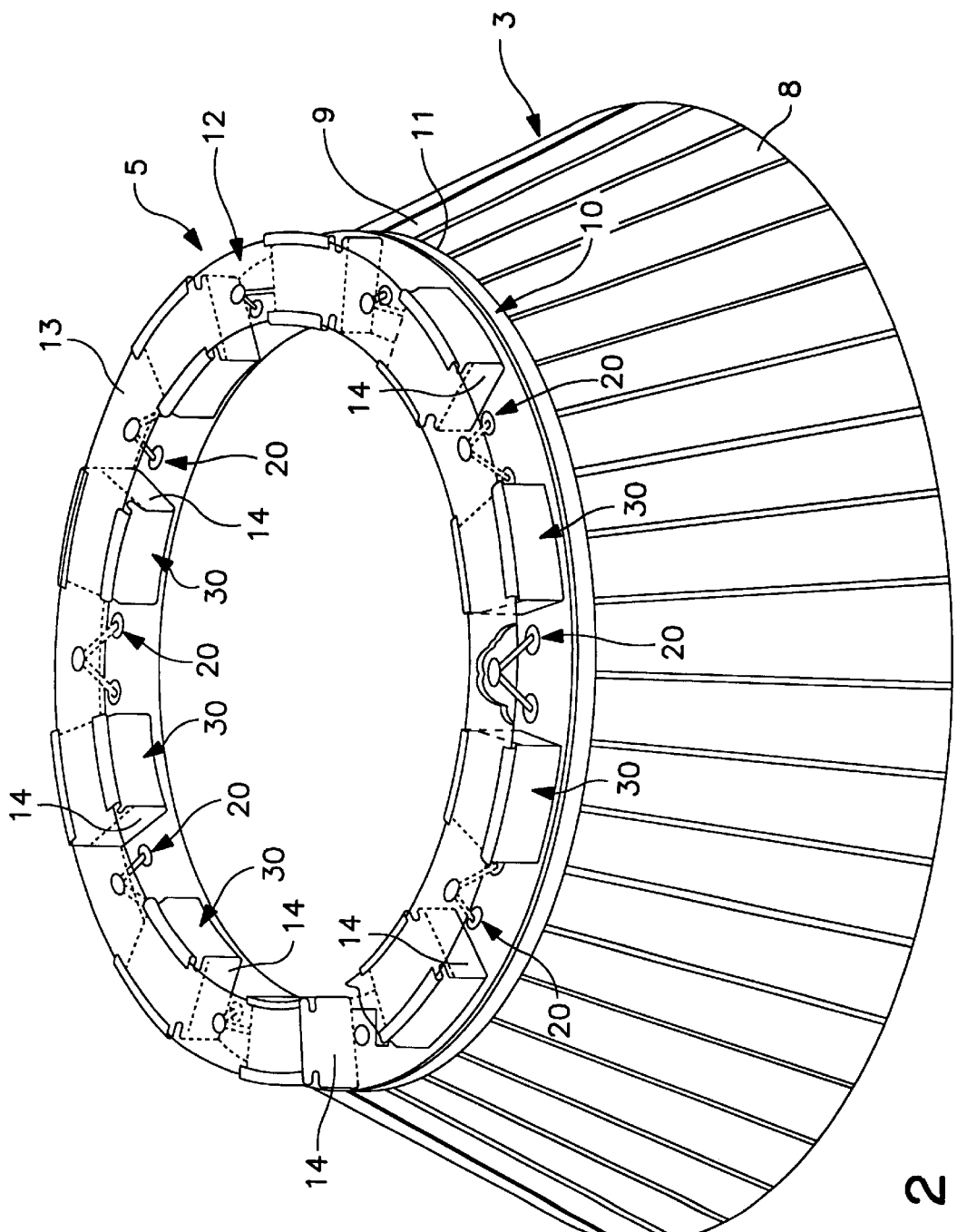
FIG. 2 is an enlarged view of the damper of FIG. 1.
Figure 3:
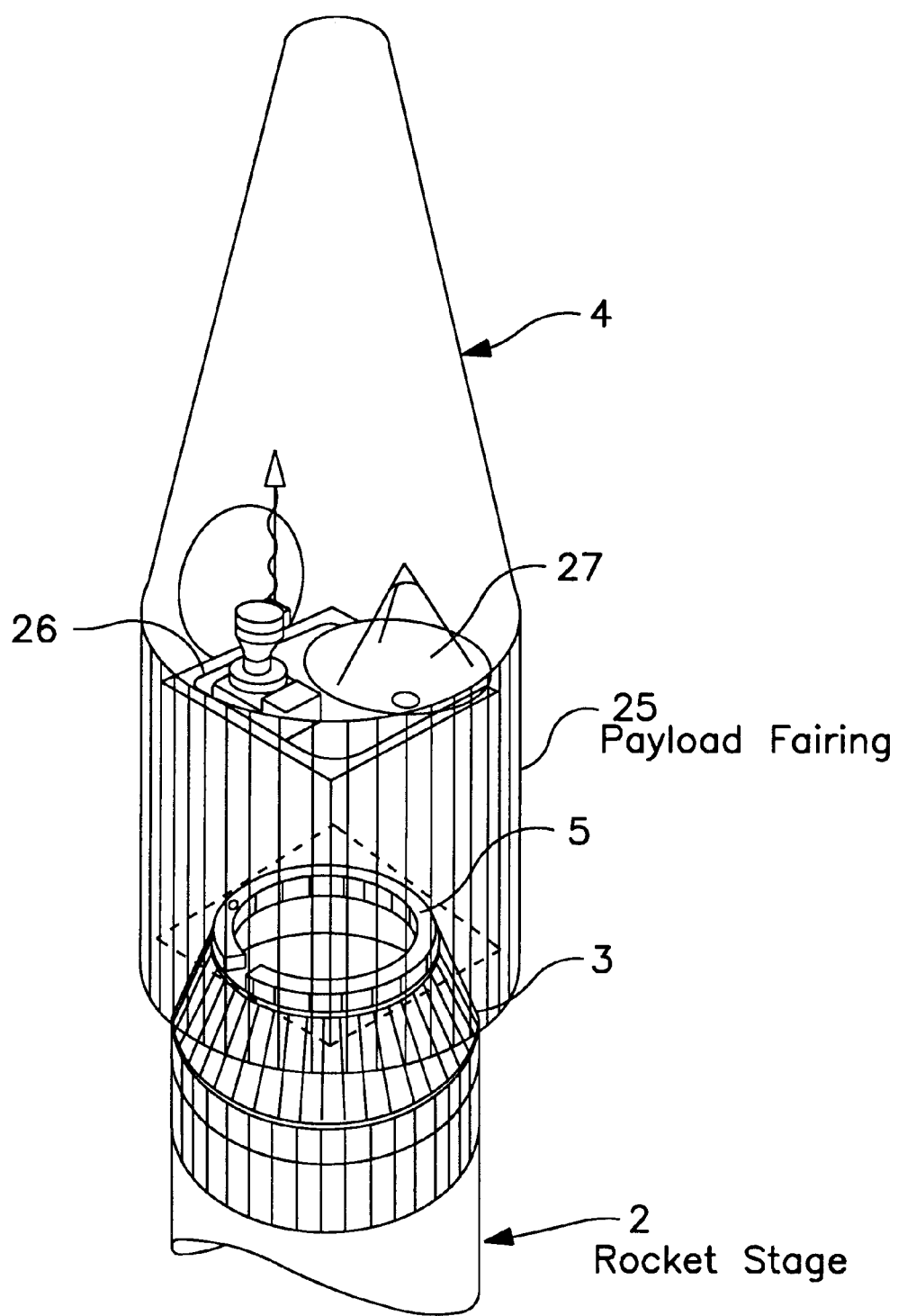
FIG. 3 is a schematic, perspective view of the spacecraft in FIG. 1 further illustrating a rocket payload in the form of a satellite with a satellite antennae and a satellite bus, each with built-in damping according to the present invention, and also depicting a payload fairing of the rocket constructed according to the invention for attenuating acoustic and other disturbances during take-off.

Apparatus 1 according to the invention as depicted in FIGS. 1–3, comprises a rocket launch vehicle 2 including an adaptor interface fitting 3. A rocket payload 4 is mounted on the rocket launch vehicle 2 by way of the adaptor interface fitting 3. A damper 5 of the invention is located between the rocket payload and the adaptor interface fitting for damping vibrations between the rocket launch vehicle and the rocket payload.

The rocket launch vehicle 2 has a generally cylindrical cross-section having a top end 6 and a bottom end (not shown). The payload adaptor fitting 3 is fixedly mounted on the top end 6 of the launch vehicle 2 in a known manner. The launch vehicle 2, the rocket payload 4, and the payload adaptor fitting 3 lie along a longitudinal axis 7. Referring to FIG. 2, the adaptor interface fitting 3 has the shape of a cone section having opposite circular ends 8, 9. The circular end 8 has a larger diameter than the diameter of the other circular end 9. The top end 6 of the launch vehicle 2 is fixedly connected to the circular end 8 of the adaptor interface fitting 3.

The damper 5 lies along the longitudinal axis 7 and is operatively connected between the circular end 9 of the fitting 3 and the payload 4 as shown in FIG. 3. The damper 5 includes a first ring-shaped member 10 having a first platform surface 11 engaged with the circular end 9 of the fitting 3. The damper 5 also includes a second ring-shaped member 12 having a second platform surface 13 for engagement with the rocket payload 4.

A series of composite structure elements 14 according to the invention are disposed between and around the periphery of the first and second ring-shaped members 10 and 12. The composite structure elements 14 are spaced equally apart from each other around the first and second ring-shaped members. The construction of each of the composite structure elements 14 is the same in the disclosed embodiment, each having an essentially block configuration with a built-in damping capacity for minimizing or eliminating the need for an actively controlled damper of the type disclosed in U.S. Pat. No. 5,655,757, for example. The elements are held in position between the members 10 and 12 by enclosure members 30 crimped to the sides of the second ring-shaped member 12 and extending along the elements 14 as shown in FIG. 2. Other fastening arrangements or bonding of the components could also be employed to secure the elements 14 in position.

Figure 4:
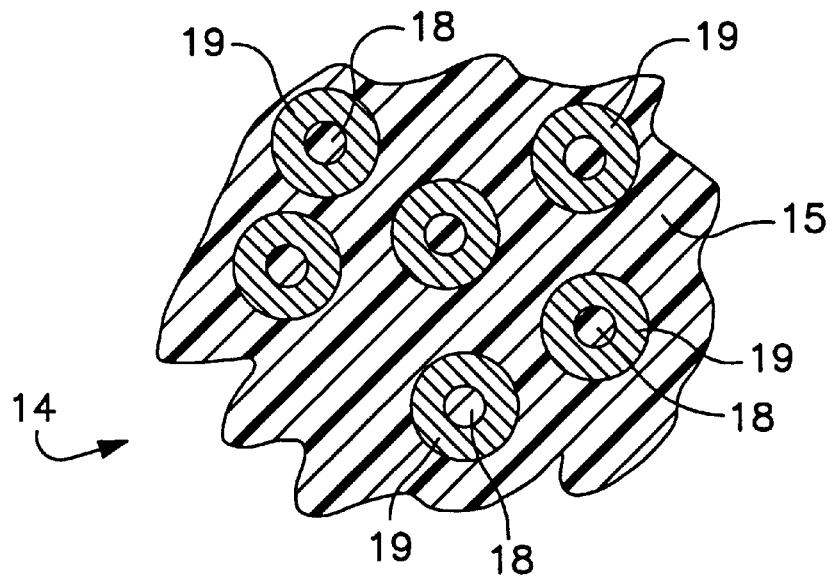
FIG. 4 is a schematic, cross-sectional view, taken transverse to the longitudinal extent of filaments therein, of a composite structure element according to one embodiment of the invention, wherein a lightweight metal having a specific damping capability of at least 1% is provided on the filaments within the non-metallic matrix of the composite.

Each composite structure element 14 of the ring-shaped damper 5 comprises, in the form of the invention depicted in FIG. 4, a non-metallic matrix 15, a plurality of filaments 18 and a lightweight metal 19 having a specific damping capability of at least 1% provided on the filaments of the composite structure element for attenuating vibrations of the element. The non-metallic matrix 15 is preferably a resin material, for example, an epoxy resin, which can be injection-molded or otherwise provided about the filaments 18 with lightweight metal coating 19 thereon to form the composite structure element.

Figure 7:
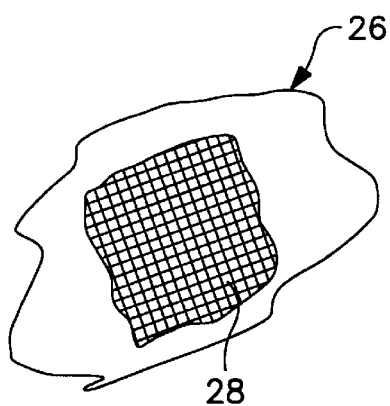
FIG. 7 is an enlarged portion of the satellite bus in FIG. 3, partially in cross-section, depicting a woven cloth of bidirectionally extending filaments used in forming the composite structure element of the bus.

The filaments 18 is of composite structure element 14 are carbon fibers in the disclosed embodiment, but filaments of other materials could be employed as noted above. The filaments 18 in FIG. 4 extend unidirectionally in the matrix 15. Their length can be continuous along the longitudinal extent of the composite structure element. Alternatively, the filaments 18 can be in the form of a woven cloth of filaments 28 extending bidirectionally in the matrix, as illustrated in FIG. 7. In another form of the invention, the filaments can be chopped fibers having a relatively short length and being randomly directed in the matrix, as shown at 24 with respect to the embodiment in FIG. 5.

The filaments 18 in the composite structure element 14 of FIG. 4 are each coated with a lightweight metal having a specific damping capability of at least 1% for attenuating vibrations of the element. The lightweight metal is preferably selected from the group consisting of a magnesium alloy and an aluminum alloy. Table 1 below lists aluminum and magnesium alloys, by their ASTM designation, along with their specific damping capacity, percent at varying levels of stress, which provide the aforementioned specific damping capability of at least 1% at one or more levels of stress for attenuating vibrations of the element.

TABLE 1

| Alloy (ASTM Designation) | Temper | Specific damping capacity, %, at | | | | |
|---|---|---|---|---|---|---|
| | | 7.0 MPa (1.0 ksi) | 14 MPa (2.0 ksi) | 20 MPa (3.0 ksi) | 25 MPa (3.5 ksi) | 35 MPa (5.0 ksi) |
| Mg Alloys | | | | | | |
| K1A | F | 40.0 | 48.8 | 56.0 | 61.7 | 66.1 |
| AS21A | F | 16.0 | 33.33 | 48.0 | 53.33 | 60.0 |
| AS41A.XB | F | 5.33 | 13.33 | 21.33 | 28.0 | 44.0 |
| ZE41A | T5 | 1.86 | 1.94 | 2.02 | 2.06 | 2.19 |
| HK31 | T6 | 0.37 | 0.66 | 1.12 | . . . | . . . |
| AZ91A.B.D | F | 2.67 | 5.33 | 12.0 | 16.0 | 29.33 |
| AZ31B | F | 1.04 | 1.57 | 2.04 | 2.38 | 2.72 |
| Al Alloys | | | | | | |
| 355 | T6 | . . . | 0.51 | 0.67 | 1.0 | . . . |
| 356 | T6 | 0.3 | 0.48 | 0.62 | 0.82 | 1.2 |

The lightweight metal 19 is coated on the carbon fibers 18 of element 14 by vapor deposition or other conventional technique for wetting the fibers with molten magnesium or aluminum alloy. The fibers 18 are preferably coated with a thickness of metal 19 between 0.1 and 100 times the diameter of the carbon fibers 18. The coating 19 is most preferably a magnesium-zirconium alloy composed of 90–99.9 wt. % of magnesium and 10–0.1 wt. % of zirconium. These alloys have excellent damping capacity, e.g., the ability of the metal to elastically absorb vibrational energy and keep the vibrations from transmitting through the metal. Specific damping is defined as the ratio between energy lost to a maximum possible energy absorbed. Other alloys, including the aluminum alloys listed in Table 1, can be successfully used to coat the filaments. It has been found that the composite structure element 14 of the invention has a high stiffness as the most advanced structure and, at the same time, has sufficient damping capabilities for use in constructing the ring-shaped damper 5. The amount of damping in the structure can be controlled by a composite structure fabrication.

The damper 5 in FIGS. 1–3 further comprises a plurality of load-carrying springs 20 (FIG. 2) disposed between and around the first and second ring-shaped members 10, 12. The load springs 20 are spaced equally apart from each other around the first and second ring-shaped members 10, 12. The load springs 20 are disposed alternately between the series of composite structure elements 14. The load springs 20 together with the elements 14 act as load carrying and connecting elements between the first and second ring-shaped members 10, 12. When vibrations occur between the launch vehicle 2 and the payload 4, the first and second ring-shaped members 10, 12 move axially and/or laterally relative to each other. This relative movement is damped by the composite structure elements 14 disposed between and around the periphery of the first and second ring-shaped members 10, 12. In an alternate construction, the springs 20 could be omitted or placed radially inside or outside the composite structure elements. In such a case, a singular, continuous, annular composite structure element could be secured between the first and second ring-shaped members 10, 12 for damping vibration.

Figure 5:
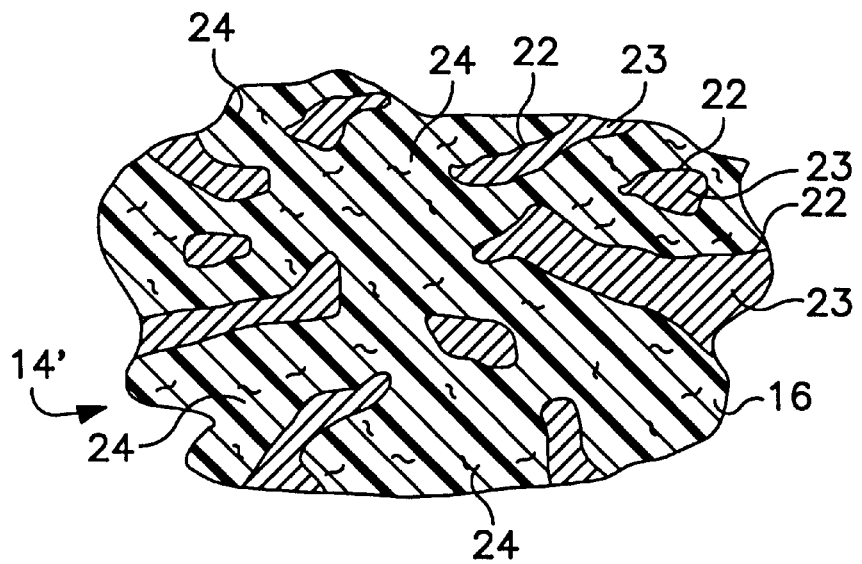
FIG. 5 is a schematic cross-sectional view through a composite structure element according to a second embodiment of the invention, wherein the pores of a porous carbon-carbon structure are filled with a magnesium-zirconium alloy.

The composite structure elements of the damper 5 according to another form of the invention, shown at 14' in FIG. 5 are formed with a porous, non-metallic matrix 16 having pores 22 which are filled with a lightweight metal 23 having a specific damping capability of at least 1% as discussed above. The matrix 16 is a porous carbonaceous material, particularly a carbon-carbon structure which is porous in nature having short, randomly directed carbon fibers 24 therein. The pores 22 of the matrix 16 are filled with the lightweight metal 23 by vapor deposition in a hot chamber at 900°, for example, or by dipping the porous structure in the molten alloy of the lightweight metal. The carbon fibers 24 in the composite structure of FIG. 5 are not coated with a lightweight metal having a damping capability of at least 1%, as in the form of the invention shown in FIG. 4, but coated fibers as in FIG. 4 could be employed in a variation of the invention together with a porous matrix material whose pores are filled with a lightweight metal having a specific damping capability of at least 1% as shown in FIG. 5.

Figure 6:
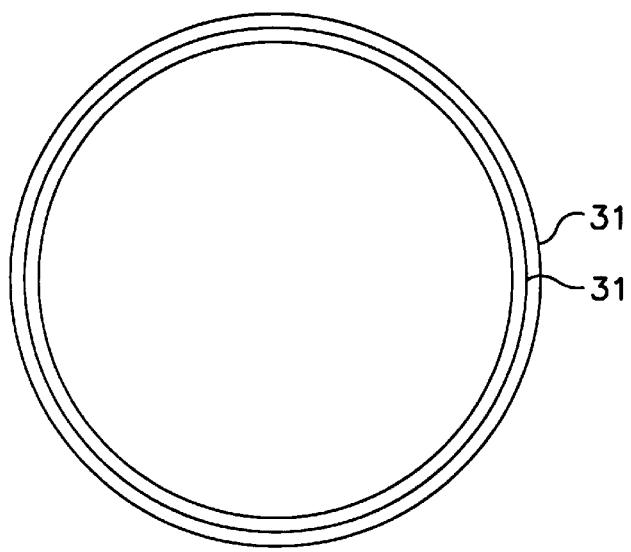
FIG. 6 is a schematic, cross-sectional view through an annular portion of a payload fairing of the spacecraft of FIG. 3 constructed according to the invention showing the use of continuous length filaments extending unidirectionally, e.g., circumferentially, about the fairing in the composite structure of the fairing.

The present invention further comprises a payload fairing 25, a satellite bus 26 and a satellite deployable antennae 27, shown generally in FIG. 3, constructed with one or more composite structure elements of the invention. The cross-section through an annular portion of the payload fairing 25, see FIG. 6, illustrates the use of continuous length filaments 31 extending unidirectionally, e.g., circumferentially about the fairing in the composite structure of the fairing. Like the damper 5, the payload fairing 25 preferably comprises a non-metallic matrix, a plurality of filaments 31 within the matrix reinforcing the matrix, and a lightweight metal having a specific damping capability of at least 1% provided on at least one of the matrix and the filaments of the composite structure element attenuating vibrations of the element. The construction of the fairing 25 could also be like that in FIG. 5.

Figure 8:
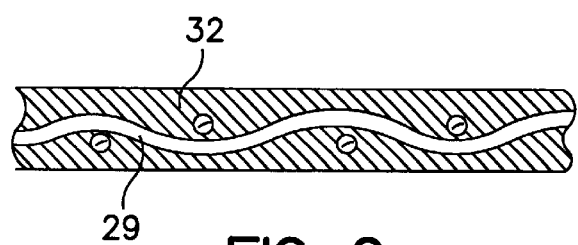
FIG. 8 is a cross-sectional view through another form of the composite structure element of the invention, particularly the satellite deployable antennae in FIG. 3, a metal wire mesh of the deployable antennae being embedded in a lightweight metal having a specific damping capability of at least 1% for attenuating vibration of the antennae.

A portion of the satellite bus 26 depicted in FIG. 7 shows the use of a woven cloth 28 of bidirectionally extending filaments, preferably carbon fibers, used in forming the composite structure element of the bus. A detail of a portion of the satellite deployable antennae 27 of FIG. 3 is shown in FIG. 8. As shown therein, a metal wire mesh 29 of the deployable antennae is embedded in a lightweight metal 32 having a specific damping capability of at least 1% in accordance with the invention for attenuating vibration of the deployable antennae. The mesh 29 is formed of molybdenum wire coated with gold. The wire mesh is embedded within the lightweight metal by dipping the wire mesh in the molten lightweight metal, or otherwise contacting the wire mesh with the lightweight metal so as to couple the structure of the deployable antennae, vibrationally, with the lightweight metal for damping purposes. Thus, it can be seen that a method of the invention for making a composite structure element with built-in damping according to the invention comprises the steps of providing a structural member which is subject to being disturbed when used for its intended purpose, and providing a lightweight metal having a specific damping capability of at least 1% on the structural member so as to damp disturbances of the structural member.

A composite structure element of the invention with the highest specific damping and highest stiffness will be lightweight with properly tailored mechanical characteristics for given structural system requirements. For example, a spacecraft bus and a spacecraft fairing of the invention are able to attenuate acoustic disturbances, as well as any other disturbance, during take-off. A slew maneuver is controllable and a settling time is shorter with the invention than with conventional spacecraft buses and fairings.

While I have shown and described several embodiments in accordance with the present invention, it is understood that the same is not limited thereto, but is susceptible to numerous changes and modifications as known to those skilled in the art. For example, the composite structure element of the invention can be used in different forms, e.g., tubing, triangles, pyramids, cubes for continuous damping or distributed damping of vibrations. It is not necessary to use a continuous solid piece. Various polymers and other matrix materials could be employed in the composite structure element. Therefore, I do not wish to be limited to the details shown and described herein, but intend to cover all such changes and modifications as are encompassed by the scope of the appended claims.

What is claimed is:

1. In a structural system comprising a structural member which is subject to being disturbed when used for its intended purpose, the improvement comprising the structural member including a composite structure element with built-in damping, said composite structure element comprising:

a non-metallic matrix;

a plurality of filaments within said matrix reinforcing said matrix; and a lightweight metal selected from the group consisting of a magnesium alloy and an aluminum alloy, and having a specific damping capability of at least 1% coated on said filaments within said non-metallic matrix of said composite structure element for attenuating vibrations of said structural member.

2. A composite structure element with built-in damping, said composite structure element comprising:
   a non-metallic matrix;
   a plurality of filaments within said matrix reinforcing said matrix; and
   a lightweight metal having a specific damping capability of at least 1% coated on said filaments within said non-metallic matrix of said composite structure element for attenuating vibrations of said element;
   wherein said element is a fairing for a spacecraft.

3. The composite structure element according to claim 2, wherein said element is a payload fairing of a rocket.

4. The composite structure element according to claim 2, wherein said lightweight metal is selected from the group consisting of a magnesium alloy and an aluminum alloy.

5. The composite structure according to claim 4, wherein said lightweight metal is a magnesium alloy containing 0.1–10 wt. % zirconium, balance essentially magnesium.

6. The composite structure element according to claim 2, wherein said matrix is plastic.

7. The composite structure element according to claim 6, wherein said plastic is an epoxy resin.

8. The composite structure according to claim 2, wherein said lightweight metal is coated on said filaments.

9. The composite structure element according to claim 8, wherein the thickness of said coating on said filaments is between 0.1 and 100 times a diameter of said filaments.

10. The composite structure element according to claim 2, wherein said filaments are carbon fibers.

11. The composite structure element according to claim 2, wherein said filaments extend unidirectionally in said matrix.

12. The composite structure element according to claim 2, wherein said filaments are continuous in length.

13. The composite structure element according to claim 2, wherein said filaments extend bidirectionally in said matrix.

14. The composite structure element according to claim 2, wherein said filaments have a random directional orientation in said matrix.

15. A composite structure element with built-in damping, said composite structure element comprising:
   a non-metallic matrix;
   a plurality of filaments within said matrix reinforcing said matrix; and
   a lightweight metal having a specific damping capability of at least 1% coated on said filaments within said non-metallic matrix of said composite structure element for attenuating vibrations of said element;
   wherein said element is a spacecraft bus.

16. The composite structure element according to claim 15, wherein said lightweight metal is selected from the group consisting of a magnesium alloy and an aluminum alloy.

17. The composite structure element according to claim 15, wherein said matrix is plastic.

18. The composite structure according to claim 15, wherein said lightweight metal is coated on said filaments.

19. The composite structure element according to claim 15, wherein said filaments are carbon fibers.

20. The composite structure element according to claims 15, wherein said filaments extend unidirectionally in said matrix.

21. The composite structure element according to claim 15, wherein said filaments are continuous in length.

22. The composite structure element according to claim 15, wherein said filaments extend bidirectionally in said matrix.

23. The composite structure element according to claim 24, wherein said filaments have a random directional orientation in said matrix.

24. A composite structure element with built-in damping, said composite structure element comprising:
   a non-metallic matrix;
   a plurality of filaments within said matrix reinforcing said matrix; and
   a lightweight metal having a specific damping capability of at least 1% coated on said filaments within said non-metallic matrix of said composite structure element for attenuating vibrations of said element;
   wherein said element is a damper element on a rocket.

25. The composite structure element according to claim 24, wherein said damper element is in the form of a ring for attenuating vibrations between a rocket launch vehicle and a rocket payload.

26. The composite structure element according to claim 24, wherein said lightweight metal is selected from the group consisting of a magnesium alloy and an aluminum alloy.

27. The composite structure element according to claim 24, wherein said matrix is plastic.

28. The composite structure according to claim 24, wherein said lightweight metal is coated on said filaments.

29. The composite structure element according to claim 24, wherein said filaments are carbon fibers.

30. The composite structure element according to claim 24, wherein said filaments extend unidirectionally in said matrix.

31. The composite structure element according to claim 24, wherein said filaments are continuous in length.

32. The composite structure element according to claim 24, wherein said filaments extend bidirectionally in said matrix.

33. The composite structure element according to claim 24, wherein said filaments have a random directional orientation in said matrix.

34. In a structural system comprising a structural member which is subject to being disturbed when used for its intended purpose, the improvement comprising the structural member including a composite structure element with built-in damping, said composite structure element comprising:
   a porous, non-metallic matrix;
   a plurality of filaments within said matrix reinforcing said matrix; and
   a lightweight metal selected from the group consisting of a magnesium alloy and an aluminum alloy, and having a specific damping capability of at least 1% filling the pores of said porous matrix of said composite structure elements for attenuating vibrations of said element.

35. The composite structure element according to claim 34, wherein said matrix is a carbonaceous material.

36. An apparatus comprising:
   a rocket launch vehicle including an adaptor interface fitting;
   a rocket payload mounted on said rocket launch vehicle by way of said adaptor interface fitting; and a damper located between said rocket payload and said adaptor interface fitting for damping vibrations between said rocket launch vehicle and said rocket payload, said damper including a composite structure element with built-in damping comprising a non-metallic matrix, a plurality of filaments within said matrix reinforcing said matrix and a lightweight metal having a specific damping capability of at least 1% coated on said filaments of said composite structure element for attenuating vibrations of said element.

37. The apparatus according to claim 36, wherein said damper is ring-shaped.

38. The apparatus according to claim 37, wherein said ring-shaped damper comprises a plurality of said composite structure elements located between said payload and said adaptor interface fitting.

39. The apparatus according to claim 37, wherein said ring-shaped damper further comprises at least one load carrying spring connected between said rocket payload and said adaptor interface fitting of said rocket launch vehicle to resist relative movement of said rocket payload and said adaptor interface fitting of said rocket launch vehicle.

40. The apparatus according to claim 36, wherein said lightweight metal is selected from the group consisting of a magnesium alloy and an aluminum alloy.

41. The apparatus according to claim 40, wherein said matrix is plastic.

42. An apparatus comprising:
a rocket launch vehicle including an adaptor interface fitting;
a rocket payload mounted on said rocket launch vehicle by way of said adaptor interface fitting; and
a rocket fairing connected to said rocket and extending about said rocket payload, said fairing comprising a composite structure element having built-in damping for attenuating vibrations during launch, said composite structure element of said fairing comprising a non-metallic matrix, a plurality of filaments within said matrix reinforcing said matrix, and a lightweight metal having a specific damping capability of at least 1% and selected from the group consisting of a magnesium alloy and an aluminum alloy, coated on said filaments within said matrix.

43. The apparatus according to claim 42, wherein said matrix is plastic.

44. A spacecraft bus comprising a composite structure element including a non-metallic matrix, a plurality of filaments within said matrix reinforcing said matrix, and a lightweight metal having a specific damping capability of at least 1% provided as a film on said filaments of said composite structure element for attenuating vibrations of said element, wherein said lightweight metal is selected from the group consisting of a magnesium alloy and an aluminum alloy.

45. The spacecraft bus according to claim 44, wherein said matrix is plastic.

46. An apparatus comprising:
a rocket launch vehicle including an adaptor interface fitting;
a rocket payload mounted on said rocket launch vehicle by way of said adaptor interface fitting; and
a damper located between said rocket payload and said adaptor interface fitting for damping vibrations between said rocket launch vehicle and said rocket payload, said damper including a composite structure element with built-in damping comprising a porous, carbonaceous material matrix, a plurality of filaments within said matrix reinforcing said matrix and a lightweight metal having a specific damping capability of at least 1% filling the pores of said porous, carbonaceous material matrix of said composite structure element for attenuating vibrations of said element.

47. An apparatus comprising:
a rocket launch vehicle including an adaptor interface fitting;
a rocket payload mounted on said rocket launch vehicle by way of said adaptor interface fitting; and
a rocket fairing connected to said rocket and extending about said rocket payload, said fairing comprising a composite structure element having built-in damping for attenuating vibrations during launch, said composite structure element of said fairing comprising a porous, carbonaceous material matrix, a plurality of filaments within said matrix reinforcing said matrix, and a lightweight metal having a specific damping capability of at least 1% and selected from the group consisting of a magnesium alloy and an aluminum alloy, filling the pores of said porous, carbonaceous material matrix of said composite structure element for attenuating vibrations of said element.

48. A spacecraft bus comprising a composite structure element including a porous, carbonaceous material matrix, a plurality of filaments within said matrix reinforcing said matrix, and a lightweight metal having a specific damping capability of at least 1% filling the pores of said porous, carbonaceous material matrix for attenuating vibrations of said element, wherein said lightweight metal is selected from the group consisting of a magnesium alloy and an aluminum alloy.

49. A composite structure satellite deployable antennae with built-in damping, said antennae comprising:
a metal mesh formed of molybdenum wire coated with gold; and
a lightweight metal having a specific damping capability of at least 1% and being selected from the group consisting of a magnesium alloy and an aluminum alloy, provided on said metal mesh for attenuating vibrations of said antennae.

* * * * *